Figure 1:
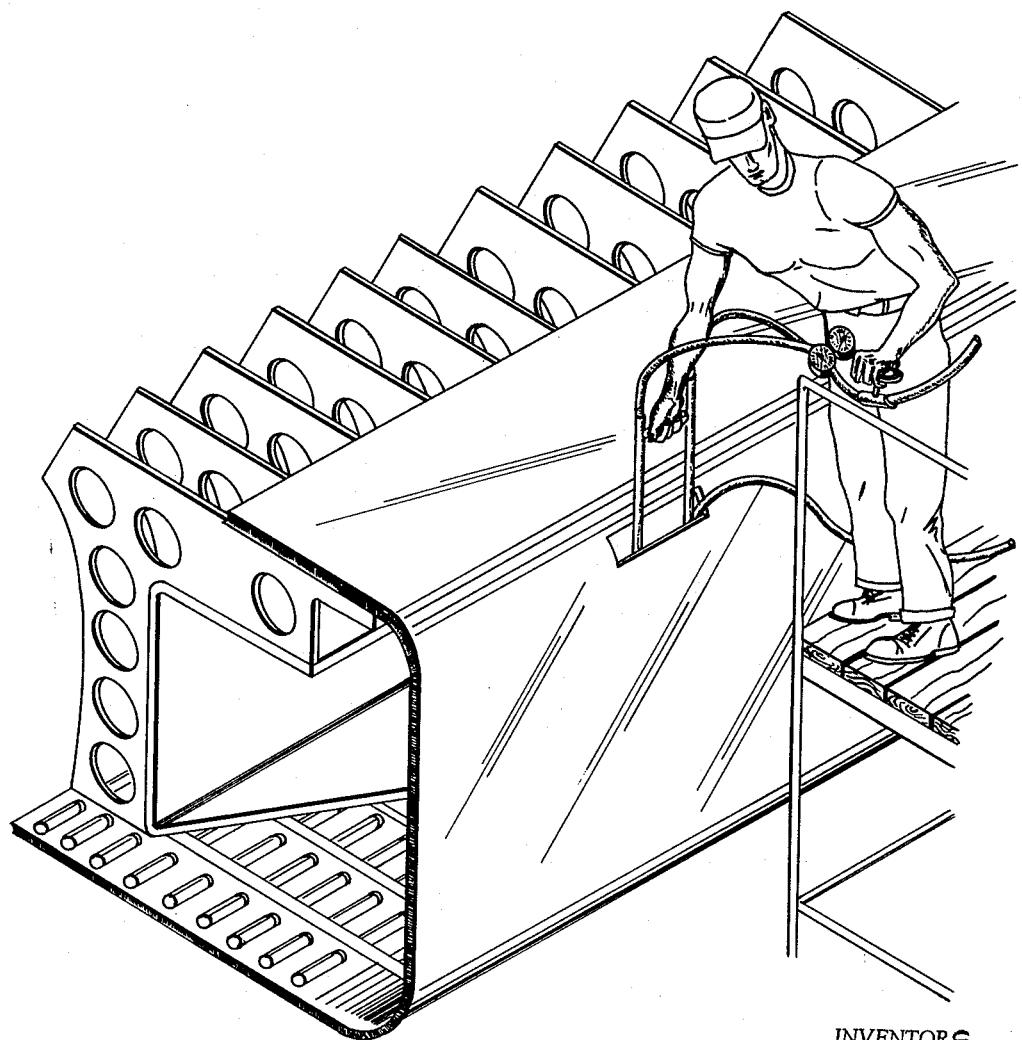

INVENTORS
DONALD V. THOMPSON
CARLTON H. WOLF
BY
*Charles F. Dieckler*
ATTORNEY

Nov. 19, 1963  D. V. THOMPSON ETAL  3,111,575
BLIND WELDING METHOD AND APPARATUS
Filed Feb. 25, 1960  3 Sheets-Sheet 2

INVENTORS
CARLTON H. WOLF
DONALD V. THOMPSON
BY
Charles F. Dieckler
ATTORNEY

INVENTORS
DONALD V. THOMPSON
CARLTON H. WOLF
BY
Charles F. Dischler
ATTORNEY

United States Patent Office 3,111,575
Patented Nov. 19, 1963

3,111,575
BLIND WELDING METHOD AND APPARATUS
Donald V. Thompson, Hawthorne, and Carlton H. Wolf, Pacific Palisades, Calif., assignors to North American Aviation, Inc.
Filed Feb. 25, 1960, Ser. No. 10,914
13 Claims. (Cl. 219—78)

This invention relates to a method and apparatus for precision welding of complex structures at locations deeply within surrounding structure, so that the weld area is not readily accessible and cannot easily be viewed during the welding process. More particularly, the invention contemplates means whereby rapid, accurate, and automatic selection of the welding position is accomplished by apparatus which uses the structure being welded as part of the welding apparatus.

The invention disclosed herein is applicable to the fabrication of any structure which involves welding in relatively inaccessible locations. However, a particular need for this invention arose in connection with the fabrication of advanced high speed type aerial vehicles, wherein the techniques and materials formerly employed for conventional supersonic aircraft and missiles are often unsatisfactory. Structure used in vehicles of the stated type must be capable of withstanding the extreme temperatures and stresses encountered during operation of the vehicle. As a specific example, thin sheet metal skin surfaces such as formerly used in aircraft construction are totally inadequate, and reinforced skin surfaces of honeycomb sandwich panel type are necessary. Rivets for securing reinforced type skin surfaces are largely impractical, since rivets are both too short and too weak to secure effectively structural elements of such thickness. In addition, in the manufacture of vehicles of the stated type, materials of construction formerly in wide use have been discarded in favor of new materials of increased hardness and strength, with consequent decrease in machinability, necessitating specialized fabrication techniques.

In accordance with widely known methods of manufacture, the major structural components such as wings and fuselage of vehicles within the stated type are made separately. Moreover, each of these components may comprise sub-assemblies in the form of large sections which are separately fabricated and then securely joined together. Welding is the most acceptable method of joinder between such sections, based upon a comparison of factors such as cost, overall strength, and production feasibility for welding as against various alternative fastening means.

However, sections of the type referred to above are characterized by relatively great length and by complex internal bracing which severely limits the available working area within which welding may be accomplished and which in addition completely obscures from view the precise location of the weld while it is being accomplished. In addition, problems incident to accurate fitting of large welded components are acute, and precision welding is often necessary to avoid the slightest distortion and resulting misalignment due to stresses induced by the heat of welding. The welding problem is further complicated by the use of advanced metal alloys such as tungsten steel in the structures to be welded, requiring high heat and increased pressure to effect the fusion of metals. The heavy, high powered equipment normally required in high temperature, high pressure welding applications known to the prior art would be unsuitable in a closely confined working area such as in the problem situation described above. Also, conventional long-reach apparatus, such as an electrode mounted on each of two long arms, is totally inadequate at the distances involved in the problem situation described. High welding pressure cannot be achieved with such apparatus without deflection of the arms due to the resulting high stress. Such deflection prevents accurate positioning of the weld area, particularly where the area cannot be viewed.

Although the method and apparatus herein disclosed are of wide general application, their use in joining internal bracing with outer surface panels is of particular interest. The invention herein disclosed has been most effective in welding bracing of corrugated form to surface panels of sandwich type construction using a honeycomb filler.

Accordingly, it is a general object of the inventive concept disclosed herein to provide an improved apparatus for welding sub-assemblies wherein the precise location and area of the weld are not clearly viewable, and wherein automatic indexing of the welding device is accomplished for accurate positioning thereof.

It is a further object of the invention herein disclosed to provide improved long-reach apparatus for welding at distant locations not visible during the welding process, using high welding pressure.

It is a further object to provide an improved method of welding bracing or spar members of corrugated form to surface panels of planar or curved form.

Figure 2:
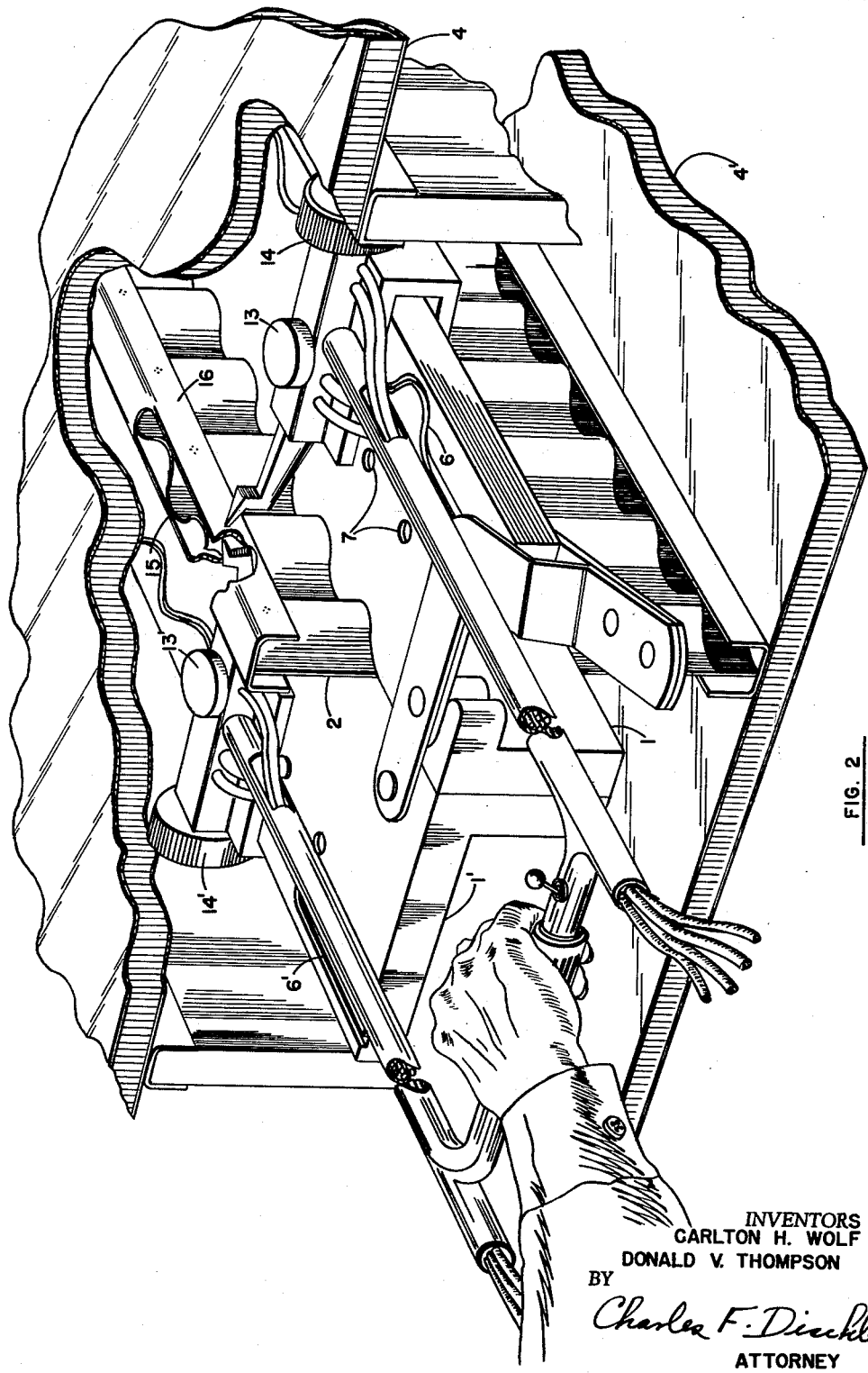
Figure 4:
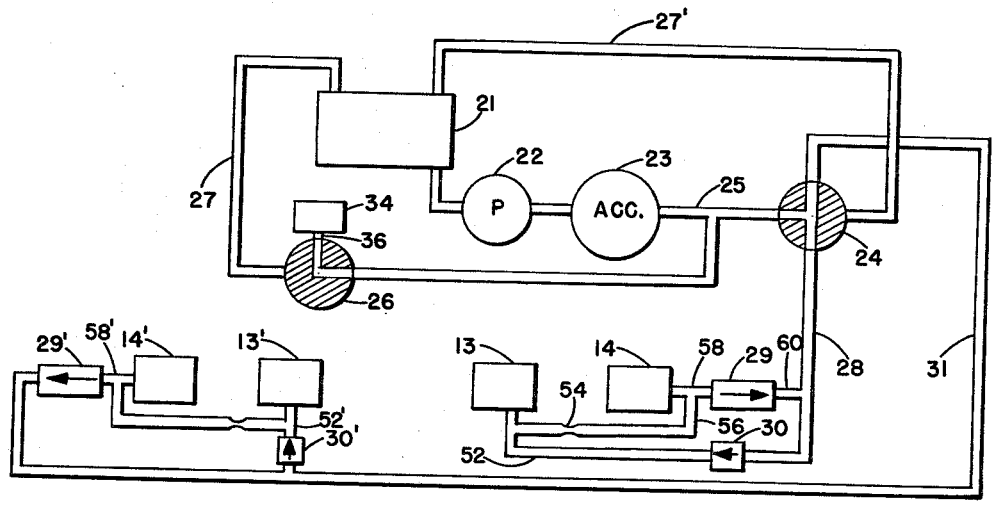
Figure 3:
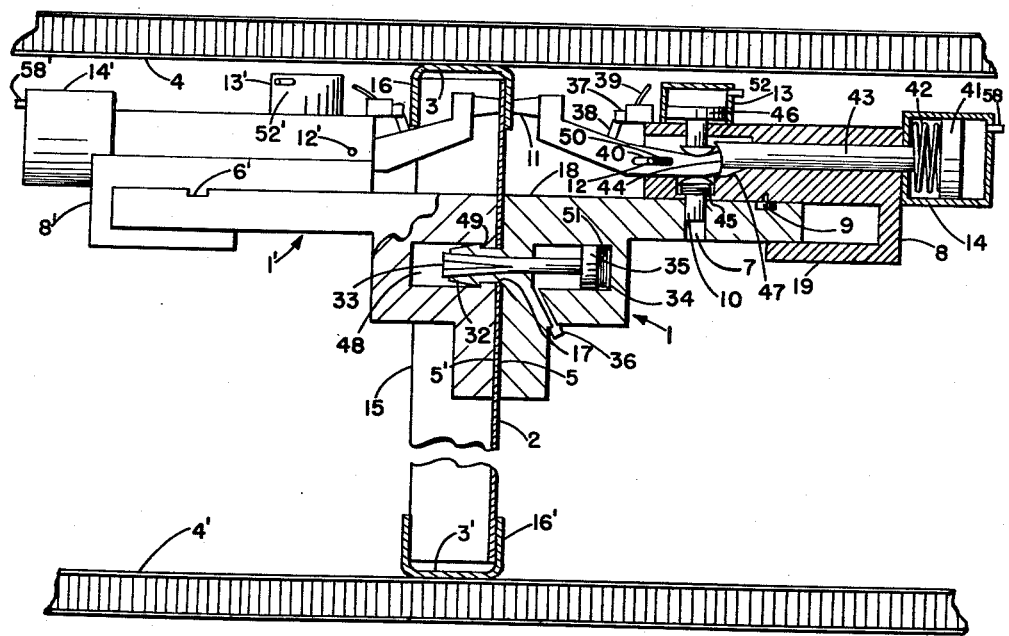

Other objects and advantages will become apparent upon a close reading of the following detailed description of an illustrative embodiment of the invention, reference being had to the accompanying drawings wherein:

FIGURE 1 shows a general view of the apparatus disclosed herein being used in fabricating a structure, FIGURE 2 shows a more detailed perspective view of the apparatus in use during welding of a wing spar and skin assembly, FIGURE 3 shows an end view, partly in section, of the welding apparatus shown in FIGURE 2, and FIGURE 4 shows in schematic form a suggested hydraulic system for use with the welding apparatus of FIGURES 1 through 3.

The welding apparatus disclosed herein includes a plurality of supporting elements which lie on opposite sides of the work to be welded and which may take the form of two guide bars 1 and 1' as shown in FIGURE 3 wherein matching convolutions are provided along surface 5 of each guide bar. The problem situation pictured by FIGURE 3 involves fabrication of an airfoil member having upper and lower skin surfaces 4 and 4' with channel members 3 and 3', respectively, secured thereon, and internal webs or bracing members 2. Welding in the final stage of assembly occurs between web 2 and upper channel member 3. Since web 2 is corrugated as shown, surfaces 5 are of generally sinusoidal wave form. However, the shape of surfaces 5 or of web 2 could obviously take a planar or any other form without materially altering the inventive principles here involved. Moreover, surfaces 5 in the example shown might advantageously be made planar with protruding ledges having edges of scalloped or wave form to clamp corrugated web 2 therebetween, which would simplify the machining process in making guide bars 1 and 1'.

Guide bars 1 and 1' are secured to each other by suitable means such as a manually operated toggle as shown in FIGURE 2. Guide bars 1 and 1' are further adapted to be tied or secured to each other and to web 2 by a plurality of projections in the form of tie pins 32 spaced at regular intervals and which may advantageously be made integrally part of one guide bar such as guide bar 1 as shown, while the other guide bar 1' is provided with hollow cavities or holes 48. The web 2 is also provided with a plurality of tooling holes 17 at spaced intervals along its entire length. Each tie pin 32 is split or segmented at its left or distal end as shown in FIGURE 3 and has a hole axially therethrough with a tie pin lock 33 located therein. Each tie pin 32 is further provided with an annular ridge 49 which projects outwardly from the sides thereof, for engagement with an annular ledge formed on the inner sides of hole 48. The distal end of tie pin 32 in its undisturbed condition collapses inwardly disengaging ridge 49 from the ledge inside hole 48, permitting pin 32 to be removed by movement of the same toward the right. Lock 33 in the form shown comprises a shaft with a split end, the two split portions of which normally extend away from each other to form a V-shaped opening therebetween. Guide bar 1 is provided with a plurality of tie pin lock cylinders 34 in which pistons 35 are situated. Each piston 35 is integrally formed with the split-ended shaft comprising tie pin lock 33, so that fluid pressure applied to piston 35 by means of conduit 36 will cause movement of the shaft toward the right as drawn, causing the split end to wedge tightly into the hollow tie pin 32 and spreading the distal end of the pin which engages ridge 49 with the inner ledge of hole 48. Upon release of fluid pressure in cylinder 34, compression spring 51 contained therein forces piston 35 toward the left, permitting the split end of tie pin 32 to collapse inwardly so that the pin may be removed and guide bars 1 and 1' may be separated. Alternatively, the supporting elements such as bars 1 and 1' could be made as part of the permanent structure upon which welding is accomplished, which would eliminate the need for joinder means such as tie pins 32 since the elements could be permanently secured to the structure referred to above.

Guide bars 1 and 1' are provided with guiding means in the form of cam tracks or grooves 6 in the upper surface of the guide bars. Cam tracks 6 are shaped to correspond to the cross-sectional shape of web 2, and in the example shown by FIGURE 3 are therefore of sinusoidal wave form. Index holes 7 are also provided in the upper surface of guide bars 1 at regular intervals, as indicated in FIGURE 2. Each guide bar 1 and 1' supports a movable carriage assembly or welding head 8 and 8', respectively, from one side of which welding means 11 extends toward the opposite carriage. Since carriage assemblies 8 and 8' are essentially similar but oppositely facing, only one need be described in detail.

Carriage 8 is in slidable engagement with guide bar 1 to permit movement of the carriage along the guide bar from one end to the other. Flange 19 restrains the carriage against vertical movement with respect to the guide, but permits some lateral movement as will appear from FIGURE 3. Carriage 8 is thus movable a long distance in a direction generally parallel to web 2, with limited freedom of movement in a direction generally perpendicular to the web. Movement of carriage 8 may be either by manual means, as shown in FIGURE 2 for example, or by suitable mechanical means for applying force in the direction shown.

Carriage 8 is provided with cam follower 9 and index pin 10 which function to control the path of movement and the stopping position of carriage 8. Cam follower 9 may take the form of a roller or a pivoted slide block which engages the sides of cam track 6 and causes the carriage to move along an undulating path or direction corresponding to the shape of the cam track 6. Index pin 10 is vertically movable between a retracted and an extended position, and is shown in FIGURE 3 in the extended position. Pin 10 is moved to the extended position when force is applied indirectly on the pin by hydraulic piston 46 within indexing cylinder 13. The retracted position in which pin 10 is withdrawn from hole 7 is achieved by upward force on the pin exerted by spring 45.

Electrode 11 is pivotally rotatable about pivot pin 12 in carriage 8, and is laterally movable by applying force on the right end of electrode 11. From FIGURE 3 it may be seen that pressure in cylinder 13 forcing piston 46 downwardly will apply a force tending to rotate electrode 11 clockwise about pin 12. The top of index pin 10 contacts electrode 11, and spring 45 biases the pin upwardly, exerting a force which opposes the downward movement of piston 46. Thus, when hydraulic force is applied in cylinder 13, forcing piston 46 downwardly, the right-hand end of electrode 11 is moved downwardly, overcoming the force of spring 45 and extending pin 10 into index hole 7. If index pin 10 on carriage 8 is not in alignment with an index hole 7, pin 10 cannot be extended in the manner described.

Carriage 8 also has mounted thereon a welding cylinder 14 containing a piston 41 which is biased toward the right as shown in FIGURE 3 by a spring 42, and is moved toward the left by hydraulic pressure. Each piston 41 is connected to a piston rod 43 which bears against end 44 of electrode 11. Electrode 11 is also biased to the right by compression spring 50, one end of which bears against relatively immobile pin 12 while the other applies spring force against the right-hand end of slot 40. The lower edge of end 44 is contacted by an inclined cam surface 47 which is shown in FIGURE 3, so that relative movement between the edge and the surface imparts a rotational movement to electrode 11. Thus, when piston 41 moves toward the right, electrode 11 is also moved in the same general direction by spring 50, causing end 44 of the electrode to be rotated counter-clockwise about pivot 12 by cam surface 47.

Electrode 11 includes contact means for applying electrical current thereto during the welding process as shown in FIGURE 3. The contact may be of any appropriate type and in the drawing comprises spring type bayonet contacts 37 and 38, mounted on carriage 8 and electrode 11, respectively. When electrode 11 is in the welding position as shown in FIGURE 3, the contacts 37 and 38 are in close frictional engagement, permitting the necessary voltage to be applied to the welding tip of electrode 11 by cable 39. When the welding tip is rotated downwardly by the action of spring 45 and cam surface 47, the bayonet contacts 37 and 38 are separated and voltage cannot be applied to the welding tip.

Departing for a moment from the mechanical details of the apparatus, FIGURE 4 shows the general configuration of the hydraulic system. A low pressure reservoir 21 collects residual fluid and supplies pump 22, the outlet from which connects with accumulator 23. Fluid under high pressure thus leaves the pump and passes through the accumulator to valves 24 and 26, respectively.

Valve 26 is a two-way valve which may be rotated to connect hydraulic cylinder 34 either to pressure line 25 or to drain line 27. Conduit 36 is provided between valve 26 and cylinder 34 as shown both in FIGURES 3 and 4.

Valve 24 is a three-way valve which may be rotated to connect lines 28 and 31 simultaneously either to pressure line 25 or to drain line 27'. In the position shown by FIGURE 4, lines 28 and 31 are simultaneously pressurized by fluid from line 25. Each of the lines 28 and 31 operate one of the welding carriage assemblies 8 and 8' previously described.

Hydraulic line 28 is connected to cylinders 13 and 14, so that both cylinders are either pressurized or drained according to the condition of line 28 as affected by the position of valve 24. However, means are provided in the system to insure that cylinder 13 is always pressurized before cylinder 14. Means are also provided to insure that cylinder 14 is always drained before cylinder 13 is drained.

Considering first the pressurized condition, it may be seen from FIGURE 4 that valve 24 in the position shown will apply pressure from pump 22 to line 28. The resulting flow will occur through line 28, check valve 30 in the direction indicated by the arrow located thereon, and through line 52 into cylinder 13. Flow from line 28 directly into cylinder 14 is prevented by check valve 29 which permits flow only in the direction shown by the arrow located thereon. Flow into cylinder 14 can occur from line 52 through restrictor 54, and lines 56 and 58. However, flow into cylinder 14 by this means is materially impeded by restrictor 54, so that the fluid pressure in cylinder 14 will eventually equal that in cylinder 13, but will require a substantially greater time to build up to the stable pressurized condition due to the flow characteristics of the system as described above. Also, although check valve 29 permits flow from line 58 into line 28, it is obvious that no such flow will occur since line 28 in the pressurizing condition being described at this time contains a pressure equal to or greater than that occurring in line 58. Thus, cylinder 13 will be pressurized sooner and at a higher rate than cylinder 14.

When valve 24 is rotated 180° so that line 28 is connected to drain line 27', fluid will drain from cylinders 13 and 14. Fluid emptying from cylinder 13 is prevented from escaping through line 52 directly into line 28 by check valve 30 which prevents flow in the direction opposite to that indicated by the arrow located thereon. Accordingly, both cylinders 13 and 14 drain into line 58, thence through check valve 29 into lines 60 and 28. However, fluid in cylinder 14 drains directly into line 58 without any significant restriction, whereas cylinder 13 drains into line 58 only by flowing through restriction 54 which materially impedes such flow and results in cylinder 14 draining much sooner and faster than cylinder 13.

Considering now the system configuration for cylinder 34 as shown by FIGURE 4, it may be seen that valve 26 can connect the cylinder to pressure supply line 25 or to drain line 27. Thus, the hydraulic system is divided into two main branches, one of which is controlled by valve 24 and the other by valve 26. That portion of the overall system controlled by valve 24 is further divided into two portions which comprise the two welding carriage assemblies 8 and 8' referred to above.

*Operation*

The first step in operating the welding apparatus herein disclosed requires positioning of guide bars 1 and 1' in clamping relationship on each side of the work to be welded. In the problem situation used to illustrate the apparatus in FIGURES 2 and 3, the work to be welded consists of an airfoil structure having upper and lower skins 4 and 4', respectively, joined to a corrugated web 2. During assembly, channel 3' may first be joined to lower skin 4' by suitable means, then web 2 may be joined to channel 3' by spotwelding the channel flanges 16' to the lower edge of the web along its entire length. A plurality of webs 2 may thus be attached to lower skin surface 4' at regular spaced intervals, after which the welding apparatus disclosed herein may be used to secure the upper skin 4 to complete the airfoil structure. The guide bars 1 and 1' are aligned on each side of web 2 with tie pins 32 on guide bar 1 penetrating holes 17 in the web. With holes 48 in guide bar 1' aligned with pins 32, the bars are brought together so that the pins are contained within the holes. Valve 26 located, for example, within reach of the welding equipment operator, is rotated into the position shown in schematic form by FIGURE 4, so that cylinders 34 are pressurized through lines 36, forcing pistons 35 toward the right as drawn in FIGURE 3, pulling tie pin locks 33 into wedging relationship with tie pins 32, engaging rims 49 in holes 48 and securely holding guide bars 1 and 1' tightly clamped to each other and to web 2.

The next step requires positioning of carriages 8 and 8' on guide bars 1 and 1', respectively, with cam followers 9 located in cam tracks 6 and flanges 19 in sliding engagement with the guide bars. Channel members 3 having been previously joined to skin surface 4 by suitable means, the skin section is then overlayed on web or webs 2 with the webs contained between flanges 16 of the channels 3. At this stage of the process, the valve 24 remains in the position connecting lines 28 and 31 with drain line 27', so that cylinders 13, 13', 14 and 14' are unpressurized. In this condition, spring 42, for example, forces piston 41 toward the right as drawn in FIGURE 3, and spring 45 forces index pin 10, end 44 of welding electrode 11, and piston 46 upwardly. With both carriages 8 and 8' in this condition, the welding tip on each electrode 11 is held down in the idle or shut-off position with contacts 37 and 38 separated.

The actual welding operation is commenced by rotating valve 24 to a position admitting slight hydraulic pressure to line 28, for example, whereby slight downward force will be applied by piston 46 in cylinder 13. Due to the force of spring 42, which exceeds that of spring 45, actuation of piston 41 requires a pressure much greater than that which suffices to extend index pin 10. Downward force on piston 46 overcomes the upward force of spring 45 and tends to rotate end 44 of electrode 11 clockwise. With force thus applied to index pin 10, the carriage assembly 8 is then moved in a direction generally parallel to web 2, and when the pin is aligned with an index hole 7, permitting extension of the pin into the hole, this action will occur. When pin 10 moves to the extended position due to downward force of piston 46, electrodes 11 are necessarily rotated into the welding position shown in FIGURE 3, for example, establishing contact between bayonets 37 and 38. Valve 24 is then rotated to the full pressurizing position shown in FIGURE 4, applying full pressure to cylinders 13 and 14 which will be pressurized in the order described above.

Thus, piston 41 will be forced toward the left, applying force to end 44 of electrode 11. By appropriate switch means (not shown) under the control of the operator, electrical power is then applied to the electrodes 11 through cable 39 in an amount and for the period necessary to effect a weld between flange 16 and web 2. Upon completion of a weld, valve 24 is rotated to the position connecting lines 28 and 31 to drain line 27', draining cylinders 13 and 14 in the order stated above. When cylinder 13 is completely unpressurized, spring 45 causes upward movement of pin 10, end 44 of electrode 11 and piston 46, after which the carriage 8 may be moved, and the process described above is repeated. That is, with low pressure applied in cylinder 13 the carriage 8 is again moved in the direction toward which the next weld location is desired.

Since index holes 7 are located at positions which will result in alignment of electrodes 11 at the nodes on each side of web 2, welding may occur first on one side of channel 3 and then on the other until each web 2 is securely joined to each channel 3 along both flanges 16 on each side throughout the length of the web.

Upon completion of welding one web 2 to one channel 3, the carriages 8 and 8' are removed and the guide bars 1 and 1' are disengaged by turning valve 26 to connect cylinders 34 to drain line 27, releasing tie pins 32. The guide bars may then be positioned on each side of the next web 2 to be welded, and secured in clamping relationship with the web therebetween. The carriages 8 and 8' are again mounted on the guide bars and welding is performed in the manner described above.

Thus, it may be seen that precision welding is automatically accomplished by the apparatus disclosed herein without the necessity of viewing the area of the weld. The precise location of the weld is predetermined by the shape of cam tracks 6 and the location of index holes 7. Since index pins 10 cannot extend until aligned with holes 7, and welding means 11 cannot perform any welding until rotated into the welding position which happens only when index pins 10 are extended, it necessarily follows that welding is prevented from occurring at anything but the precise location intended. Moreover, since contacts 37 and 38 are necessarily separated until electrodes 11 are in the correct position for welding, it follows that application of the welding power to the apparatus where electrical welding means are employed will have no effect until and unless the electrodes are properly situated to produce a weld at the precise location intended. Conversely, welding pressure to electrodes 11 cannot be achieved by cylinder 14 after the indexing or carriage holding means are de-energized, since cylinder 14 is necessarily drained before cylinder 13. Hence, the operator of the apparatus herein disclosed can apply both hydraulic pressure and electrical power to the welding device without being able to see the effects of either, and still know that precision welding must unavoidably result at only the precise locations which are intended to be welded. Use of the inventive concept herein disclosed requires the operator's attention only in controlling the desired pressures and electrical power, as clearly shown in FIGURE 1.

The use of two guide bars 1 and 1' has been found advantageous in the problem situation illustrated by FIGURE 3, for example, wherein two carriages 8 and 8' are needed to effect a weld between web 2 and flanges 16. However, it is obvious where only one welding tip is needed inside the structure to be welded, the other welding tip being located externally, that only one guide bar is necessary to support the internal welding means. For example, if web 2 were of heavy gage steel, tie pins 32 could be placed through holes 17 in the web with ridges 49 engaging the edge of holes 17, and guide bar 1 thus secured to the web in order to provide sufficient support to the welding apparatus. Also, where low welding pressures are sufficient to effect welding at inaccessible locations, only one carriage assembly 8 may suffice to apply the necessary heat and pressure, hence only one guide bar 1 may be used to support the carriage, and the guide bar may be secured to one of the structural elements, such as web 2, for support thereof.

While the particular structural details set forth above and in the drawings are fully capable of attaining the objects and providing the advantages herein stated, the structure thus disclosed is merely illustrative and could be varied or modified to produce the same result without departing from the scope of the inventive concept as defined in the appended claims.

We claim:

1. In welding apparatus; welding means for effecting a weld, carriage means for mounting said welding means on opposite sides of the work to be welded, support means comprising a plurality of elements for supporting said carriages, each of said elements supporting one of said carriages on said opposite sides, means for moving said carriage means relative to said support means to a desired welding position, positioning means for automatically positioning said carriages so that said welding means are in a predetermined position relative to the work to be welded, said positioning means including guide means for causing movement of said carriages to occur along a predetermined path, and indexing means for causing automatic stopping of said carriages at a predetermined location for welding.

2. The combination set forth in claim 1 in which said guide means include cam tracks in said support elements operatively engaged with at least one cam follower on each of said carriages.

3. The combination set forth in claim 1 in which said index means include at least one index hole in said support elements and at least one index pin on said carriages, said pin being movable between an extended and a retracted position, said pin being further adapted to be constrained by said hole when in said extended position, said index means further including moving means for moving said pin into said extended position, and means for moving said pin into said retracted position.

4. The combination set forth in claim 3 above in which said moving means include fluid piston means for applying force to move said index pin toward said extended position.

5. The combination set forth in claim 4 above in which said welding means comprises a plurality of electrodes, said electrodes being mounted in oppositely facing relationship on said carriage means, said carriage means including pivot means whereby each of said electrodes is rotatably movable between a welding position and an idle position, said fluid piston means including pistons adapted to apply force upon each of said electrodes to rotate said electrodes to the welding position simultaneously with movement of said index pin to the extended position.

6. A device for welding hollow members comprising a pair of support elements adapted to pass through said member, said support elements including means for attaching said elements to said member whereby said elements are entirely supported on said member, a carriage movably mounted on each of said support elements, a welding electrode mounted on each of said carriages, means for extending said pair of electrodes toward each other to weld a joint within said hollow member, means for energizing said electrodes, and means for moving said carriages relative to said support elements.

7. The structure set forth in claim 6 above, including in addition thereto, means interconnecting said carriages and said support elements whereby said electrodes are guided along a predetermined path to accurately position said electrodes for welding in a precise location within said member.

8. In welding apparatus; welding means for effecting a weld, carriage means for mounting said welding means on opposite sides of the work to be welded, support means for supporting said carriages on said opposite sides, and means for moving said carriage means relative to said support means to a desired welding position, said welding means comprising a plurality of electrodes, said electrodes being mounted in oppositely facing relationship on said carriage means, said carriage means including pivot means whereby each of said electrodes is rotatably mounted between a welding position and an idle position, each of said electrodes including electrical contact means, each of said carriages including electrical contact means, said contact means on each said electrode being adapted to contact the said contact means on each side carriage when said electrodes are in welding position and further adapted to separate when said electrodes are in the idle position, means for rotating said electrodes from said idle position to said welding position, and means for rotating said electrodes from said welding position to said idle position.

9. In welding appaartus; welding means for effecting a weld, carriage means for mounting said welding means on opposite sides of the work to be welded, support means for supporting said carriages on said opposite sides, means for moving said carriage means relative to said support means to a desired welding position, and positioning means for automatically positioning said carriages at predetermined locations relative to the work to be welded.

10. The apparatus set forth in claim 9 above in which said support means includes a plurality of supporting elements each one of which supports one of said carriages, and holding means for holding said supporting elements in relatively fixed relationship to prevent any relative movement therebetween.

11. The structure set forth in claim 10 above in which said holding means include locking means for releasably locking said elements in said fixed relationship.

12. The structure set forth in claim 10 above in which said holding means includes projections on one of said supporting elements, holes in another of said supporting elements, said projections being adapted to enter said holes, and locking means for releasably locking said projections within said holes to prevent withdrawal of said projections from said holes.

13. In welding apparatus for welding within a hollow member; welding means for affecting a weld at a plurality of locations within said hollow member, carriage means for mounting said welding means on opposite sides of the work to be welded, support means comprising a plurality of elements for supporting said carriages entirely within said hollow member, each said elements supporting one of said carriages on said opposite sides, means for moving carriage means relative to said support means to a desired welding position, and holding means for holding said supporting elements in relatively fixed relationship to prevent any relative movement therebetween, said holding means including projections on one of said supporting elements, holes in another of said supporting elements, said projections being adapted to enter said holes, and locking means for releasably locking said projections in said holes to prevent withdrawal of said projections from said holes.

References Cited in the file of this patent
UNITED STATES PATENTS

| | | |
|---|---|---|
| 1,302,230 | Shea | Apr. 29, 1919 |
| 1,989,266 | Burns | Jan. 29, 1935 |
| 2,345,630 | Ringwald | Apr. 4, 1944 |